US012335633B2

(12) United States Patent
Liao et al.

(10) Patent No.: US 12,335,633 B2
(45) Date of Patent: Jun. 17, 2025

(54) ANTI-FLICKER MECHANISM FOR A DIGITAL CAMERA

(71) Applicant: DELL PRODUCTS L.P., Round Rock, TX (US)

(72) Inventors: Chien-Chih Liao, Taipei (TW); Shiong Kheng Chua, Singapore (SG); Paul Yu, District Tamsui (TW)

(73) Assignee: Dell Products L.P., Round Rock, TX (US)

( * ) Notice: Subject to any disclaimer, the term of this patent is extended or adjusted under 35 U.S.C. 154(b) by 225 days.

(21) Appl. No.: 18/180,391

(22) Filed: Mar. 8, 2023

(65) Prior Publication Data

US 2024/0305896 A1 Sep. 12, 2024

(51) Int. Cl.
*H04N 23/745* (2023.01)
*G02B 5/20* (2006.01)
*H04N 23/73* (2023.01)

(52) U.S. Cl.
CPC ........... *H04N 23/745* (2023.01); *G02B 5/205* (2013.01); *H04N 23/73* (2023.01)

(58) Field of Classification Search
CPC ....... H04N 23/745; H04N 23/73; G02B 5/205
See application file for complete search history.

(56) References Cited

U.S. PATENT DOCUMENTS

| | | | |
|---|---|---|---|
| 8,774,614 B2 * | 7/2014 | Posehn | G03B 15/00 396/48 |
| 11,430,405 B1 | 8/2022 | Lee et al. | |
| 2020/0410651 A1 | 12/2020 | Peana et al. | |

* cited by examiner

*Primary Examiner* — James M Hannett
*Assistant Examiner* — Angel L Garces-Rivera
(74) *Attorney, Agent, or Firm* — Larson Newman, LLP

(57) ABSTRACT

An information handling system includes a camera, a neutral density (ND) filter, and a processor. The camera captures video images for display on a display device of the information handling system. The processor communicates with the camera. The processor determines a brightness level of an ambient light and a first shutter speed of the camera. The processor sets a stop level for the ND filter based on the brightness level of the ambient light and the first shutter speed. In response to the stop level of the ND filter being set, the processor sets the camera to a second shutter speed.

20 Claims, 6 Drawing Sheets

ANTI-FLICKER MECHANISM FOR A
DIGITAL CAMERA

FIELD OF THE DISCLOSURE

The present disclosure generally relates to information handling systems, and more particularly relates to an anti-flicker mechanism for a digital camera.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs, and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a camera that may capture video images for display on a display device of the information handling system. A processor may determine a brightness level of an ambient light and a first shutter speed of the camera. The processor may set a stop level for a neutral density filter based on the brightness level of the ambient light and the first shutter speed. In response to the stop level of the filter being set, the processor may set the camera to a second shutter speed.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
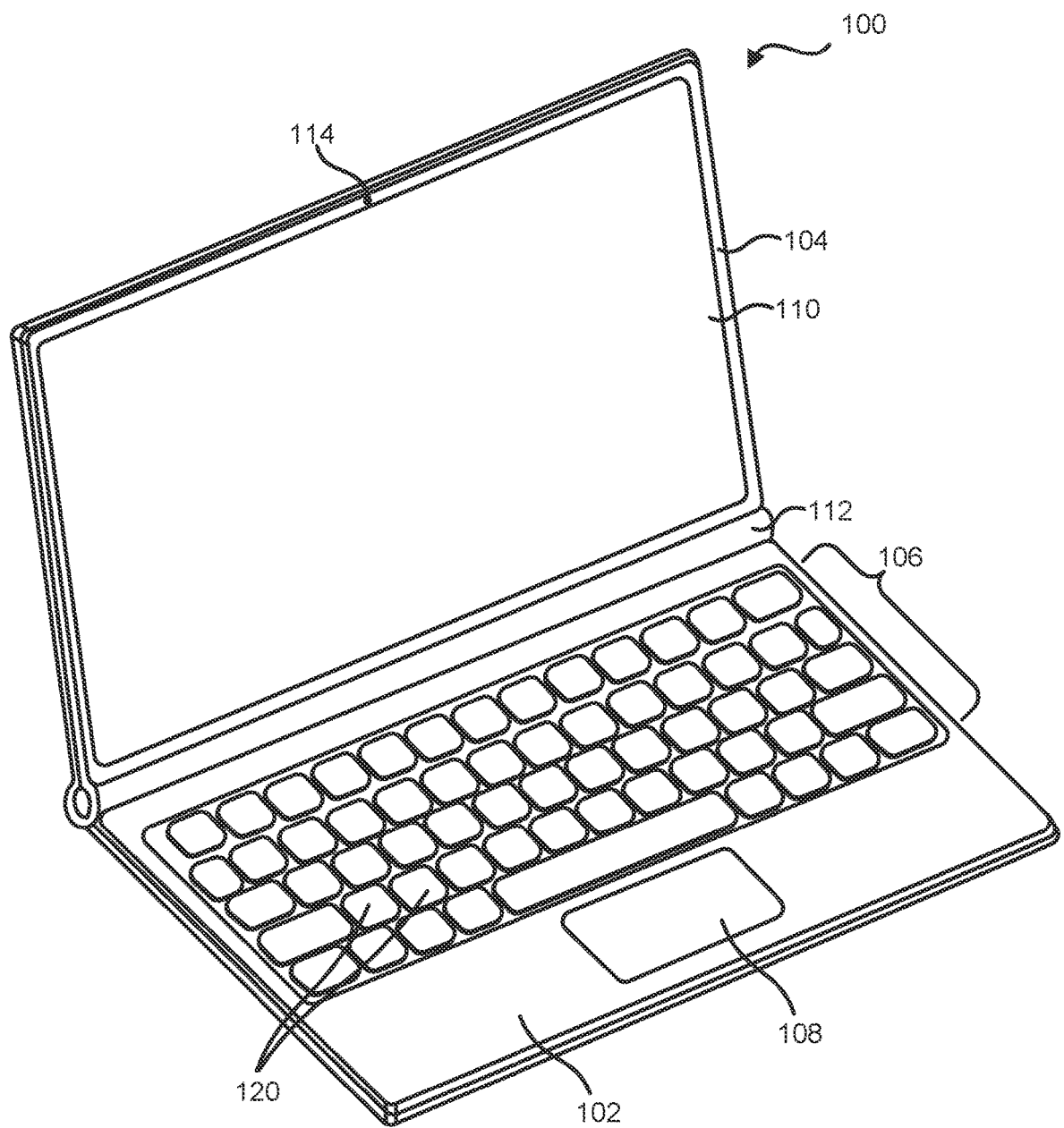
FIG. 1 is a perspective view of an information handling system according to at least one embodiment of the present disclosure.

FIG. 1 an information handling system 100 according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 100 includes a base portion 102 and a top 104. Base portion 102 includes a keyboard 106 and a touchpad 108, and top portion 104 includes a display device 110. In an example, touchpad 108 may be any suitable pointing device. Base portion 102 is connected top portion 104 via a mechanism 112, such as one or more hinges. Top portion 104 includes a camera 114. Keyboard 106 includes multiple keys 120. When the information handling system 100 comprises a 2-in-1 device, mechanism 112 may enable the top portion 104 to be connected to bottom portion 102 for use as a laptop device and may enable the top portion 104 to be detached from bottom portion 102 to enable the top portion 104 to be used as a tablet information handling system. Display device 110 may include one or more light emitting devices, such as, for example, light emitting diodes (LEDs), organic LED (OLED), liquid crystal display (LCD), another type of light emitting device, or any combination thereof.

When an ambient or artifact light source is too bright, images captured by camera 114 may flicker when displayed on display device 110. In previous information handling systems, a processor may utilize different shutter speeds to perform anti-flickering operations depending on a power frequency. For example, if the power frequency is 50 Hz, previous information handling systems may set the shutter speed to ⅟25, ³⁄100, ⅟50, or ⅟100 and implement anti-flickering operations. Additionally, if the power frequency is 60 Hz, previous information handling systems may set the shutter speed to ⅟30, ⅟40, ⅟60, or ⅟120 and implement anti-flickering operations. In the previous information handling systems, these shutter speeds may be utilized to avoid flickering in middle to low light conditions.

In some previous information handling systems, the camera may include an indoor mode, which may limit the shutter speed to ⅟120. However, this limitation may result in the image being over-exposed. Information handling system 100 may be improved by camera 114 and a processor within the information handling system performing anti-flicker operations for different lighting conditions.

Figure 2:
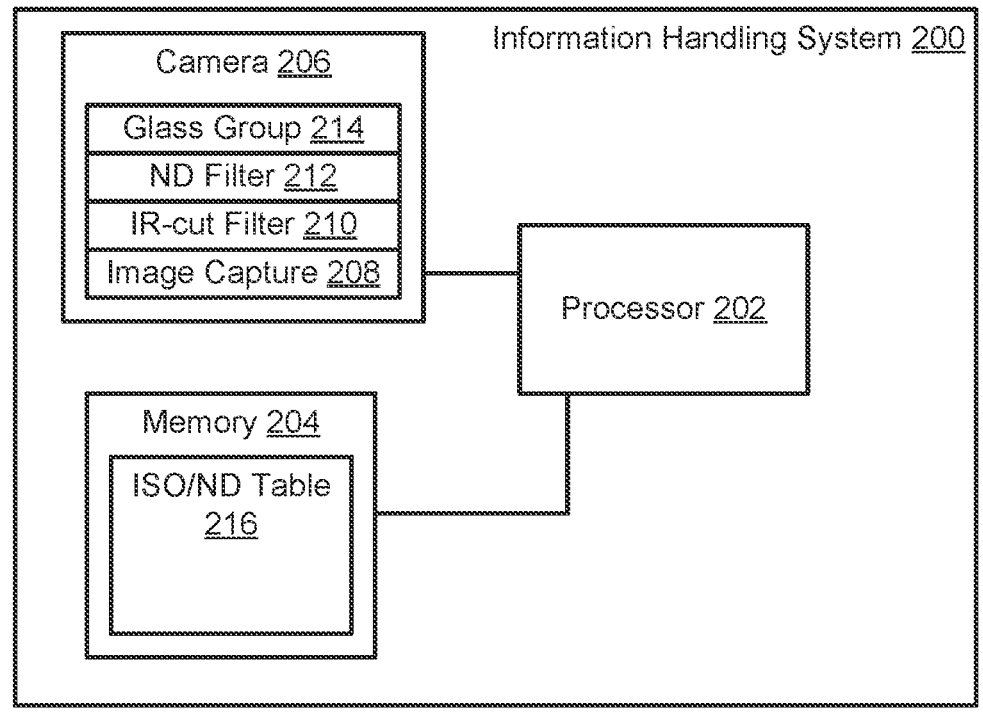
FIG. 2 is a block diagram of a portion of an information handling system according to at least one embodiment of the present disclosure.

FIG. 2 illustrates a portion of an information handling system 200 according to at least one embodiment of the present disclosure. Information handling system 200 includes a processor 202, a memory 204, a camera 206, and image capture 208, infrared (IR)-cut 210, neutral density (ND) filter 212, and glass group 214. In an example, processor 212 may control ND filter 212 to be disabled, enabled or placed in one of different stops stored in ISO/ND table 216. Memory 204 may store any suitable data for operation of processor 202, camera 206, and other components of information handling system 200. Memory 204 may store ISO/ND table 216. In an example of camera 206, image capture 208 may be an image sensor to capture an image through the lens glass group 214 and ND filter 210, such that processor 202 may control the amount light received by the lens via any suitable manner. In another example, image capture 208 may include lens and one or more components for controlling the image capture. In this example, processor 202 may be included within camera 206 without varying from the scope of this disclosure. IR-cut filter 210 may be utilized to either stop IR light or to let IR light into the image sensor 208 of camera 206. Glass group 214 may be a protective cover above ND filter 212 and IR-cut filter 210, or a transition between the ND filter 212 and the IR-cut filter. Information handling system 200 may include additional or fewer components without varying from the scope of this disclosure. Operations of processor 202, image capture 208, IR-cut filter 210, and ND filter 212 will be described with respect to FIGS. 3 and 4 below.

Figure 3:
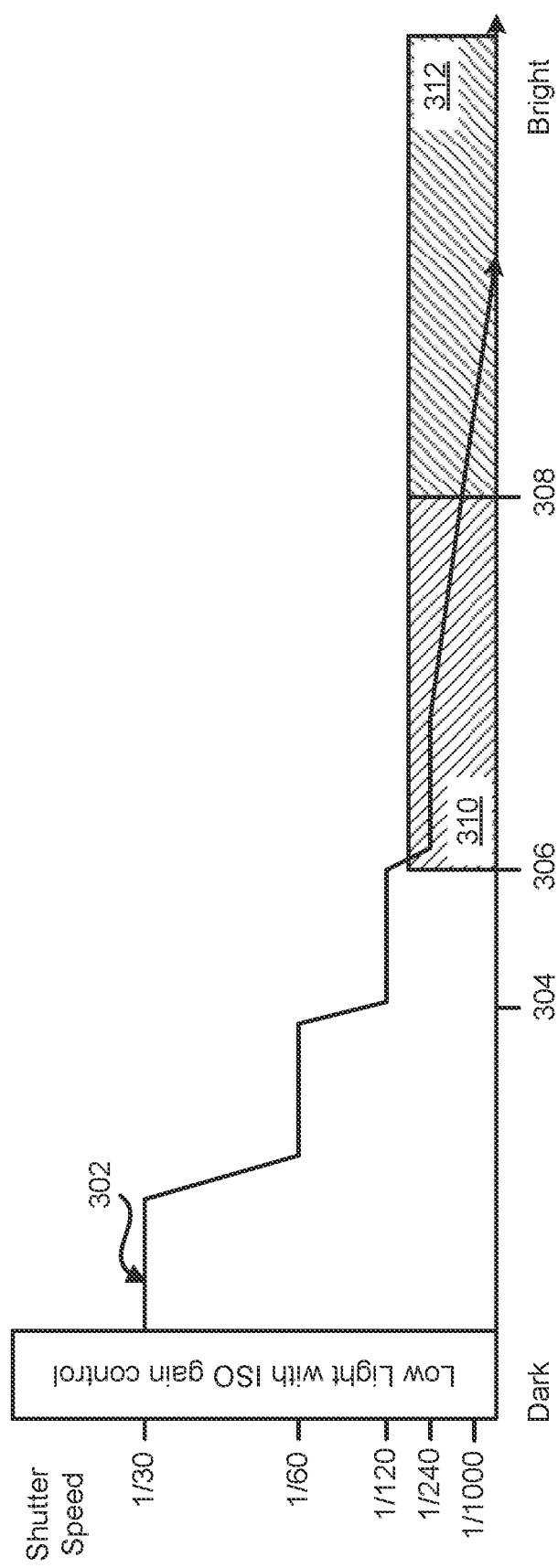
FIG. 3 illustrates a graph of shutter speed versus ambient light brightness according to at least one embodiment of the present disclosure.

FIG. 3 illustrates a graph of shutter speed versus ambient light brightness according to at least one embodiment of the present disclosure. In an example, a length of time for the shutter speed may increase along the y-axis of the graph, and the brightness of the ambient light may increase along the x-axis. Waveform 302 illustrates different shutter speeds based on the brightness of the ambient light source. For example, as shown by waveform 302, the shutter speed may be ⅟30 for dark conditions and the shutter speed may increase, such that less light is received by camera 206, as the lighting conditions get brighter. FIG. 3 illustrates exemplary shutter speeds and the shutter speeds may be any suitable values without varying from the scope of this disclosure.

In an example, waveform 302 illustrates that the shutter speed may remain the same while the ambient light is between brightness levels 304 and 306. In certain examples, brightness level 304 may be around 400 lux, and brightness level 306 may be around 720 lux. At brightness level 306, processor 202 may perform one or more operations to maintain anti-flicker of the captured image. For example, processor 202 may reduce the rate at which the shutter speed is change with respect to the change in brightness level. In this example, the processor may enter an anti-flicker mode 310.

While in anti-flicker mode 310, processor 202 may reduce the rate that the shutter speed is increased as the brightness increases. For example, the shutter speed may remain at an exemplary speed of ⅟120 while the brightness increases. While in anti-flicker mode 310, processor 202 may prevent the captured image from flickering by controlling the shutter speed of camera 206. However, processor 202 controlling the shutter speed within anti-flicker mode 310 may cause the images to be over-exposed. In this situation, processor 202 may monitor the over-exposure of the capture image and remain in anti-flicker mode 310 until the over-exposure reaches a predetermined amount or limit. In an example, the over-exposure limit may be any suitable amount including, but not limited to, 1.3 times, 1.4 times, or 1.5 times a desired exposure.

In certain examples, when the over-exposure exceeds the predetermined amount or limit, processor 202 may switch from anti-flicker mode 310 to smooth shutter control mode 312. In an example, the over-exposure limit may be reached based on the brightness level of the ambient light being at a particular level, such as brightness level 308. In certain examples, brightness level 308 may be around 1072 lux. While in the smooth shutter control mode 312, processor 202 may change the shutter speed based on the brightness level of the ambient light. For example, processor 202 may linearly increase the shutter speed with respect to an increase in the ambient light brightness level. In this example, smooth shutter control mode 312 may result in flickering when the captured image is displayed. While operating in smooth shutter control mode 312, processor 202 may change the shutter speed to prevent the captured image from being over-exposed by a particular amount. In an example, the over-exposure amount may be any suitable amount including, but not limited to, 2.5 times, 3 times, and 3.5 times a normal exposure amount.

Figure 4:
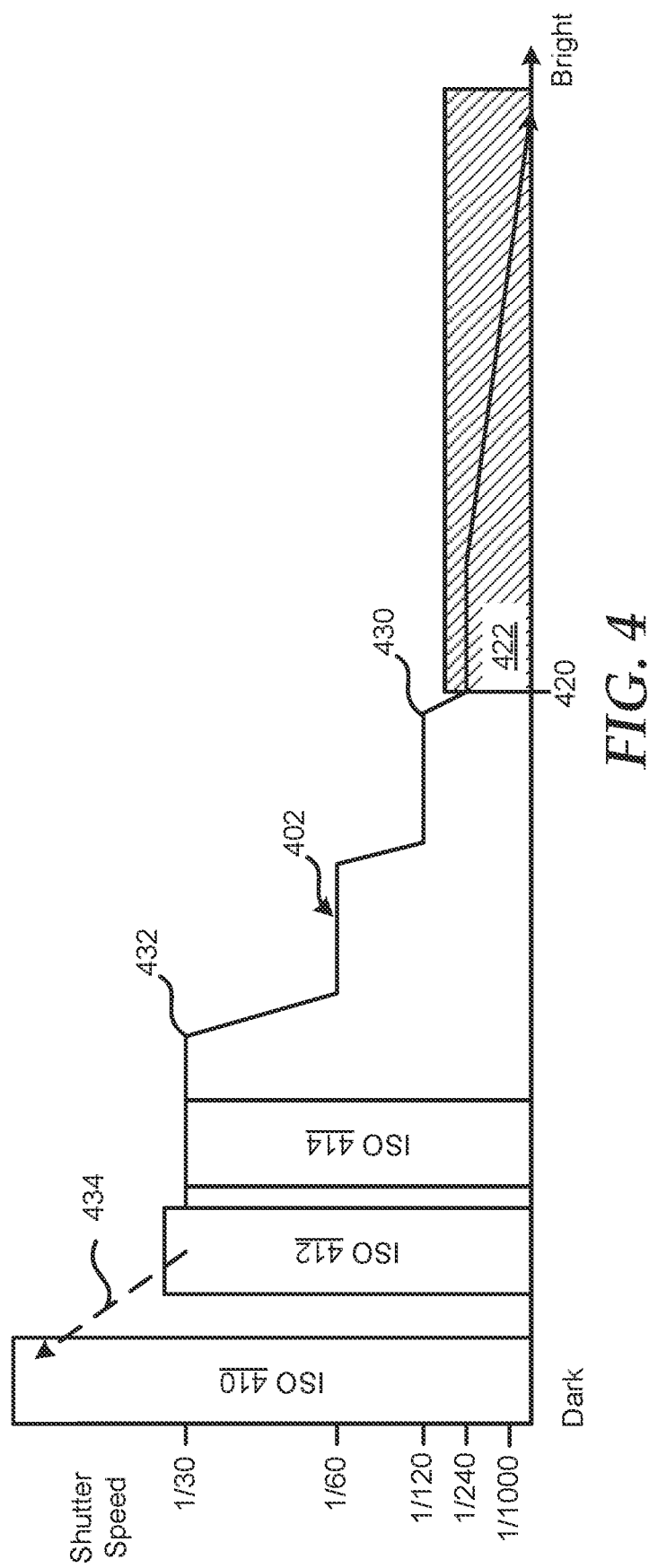
FIG. 4 is another graph of shutter speed versus ambient light brightness according to at least one embodiment of the present disclosure.

FIG. 4 illustrates a waveform 402 representing a shutter speed versus ambient light brightness according to at least one embodiment of the present disclosure. In an example, an exposure of a captured image may be controlled based on one or more settings of camera 206. The settings for the exposure of the captured image may include, but are not limited to, shutter speed, aperture, and an auto gain control, such as ISO control, which may be the scale of measurement for the light sensitivity of a camera. In certain examples, components within the camera and/or processor 202 may automatically control these settings based on ambient lighting conditions. For example, the ISO of camera 206 may be adjusted to control the sensitivity of a sensor of the camera to light. In this example, the higher the ISO number, the more sensitive the sensor of camera 206 is to light, and the lower the ISO number, the less sensitive the sensor is to light.

As shown in FIG. 4, the ISO of camera 206 may be adjusted for lower ambient lighting. For example, a most light sensitive ISO 410 may be utilized in camera 206 during very dark ambient light conditions and the ISO level may change as a brightness of the ambient light changes, such as ISO levels 412 and 414. ISO levels 410, 412, and 414 may be any suitable ISO value, such as respectively 3200, 200, and 100. As illustrated by waveform 402, processor 202 may also change the shutter speed of camera 206 based on brightness levels of the ambient light. For example, waveform 402 transitions between different shutter speeds as the ambient brightness level increases. While only a few discrete shutter speeds, such as $\frac{1}{30}$, $\frac{1}{60}$, $\frac{1}{120}$, $\frac{1}{240}$, and $\frac{1}{1000}$, are illustrated in FIG. 4, camera 206 may be set to any suitable shutter speed to change the length of time the lens of the camera is open.

In certain examples, as the ambient light increases in brightness, the shutter speed of camera 206 may be so fast that flickering is caused in the captured image. Processor 202 may improve information handling system 200 by utilizing ND filter 212 to enable the shutter speed to be slower than previous information handling systems at similar ambient light brightness levels. In an example, the slower shutter speeds of camera 206 may reduce flickering in the captured images.

During operation, processor 202 may determine a current shutter speed or ISO of camera 206 and utilize the determined shutter speed or ISO to prevent flickering in the captured image. For example, based on the current shutter speed and ISO, processor 202 may retrieve corresponding data from ISO/ND table 216 in memory 204 to determine a setting for ND filter 212. In an example, ISO/ND filter table 216 different stops of ND filter 212 and each stop may correspond to a different shutter speed or ISO of camera 206.

In certain examples, camera 206 may automatically change the ISO, the shutter speed, or the like based on ambient light brightness levels, and these changes may cause processor 202 to activate, deactivate, or change a stop of ND filter 212. In an example, if the ambient light brightness is above a particular value 420, camera 206 may enter a flickering mode 422. While in flickering mode 422, processor 202 may determine that the shutter speed of camera 206 may be so quick as to cause flickering in the captured image then ND filter 212 is utilized. Additionally, the higher or quicker shutter speed of camera 206 within flickering mode 422 may result in an ND stop value that may increase the ISO value too high, and this high value may not be suitable for capturing video images when the ambient light becomes darker. Based on these determinations, processor 202 may not activate ND filter 212.

If the ambient light brightness is below value 420, processor 202 may disable ND filter 212. In an example, if ND filter 212 was already enabled, processor 202 may take away ND-filter when on the ambient light brightness dropping below value 420. In response to ND filter 212 being activated, processor 202 may set the ND filter to any suitable stop value. In an example, each stop value of ND filter 212 may reduce an amount of light receive by the lens of camera 206 by a particular amount. In certain examples, the amount of light reduction may be an inverse of an ND factor of ND filter 212, such that an exposure time may increase by the ND factor as illustrated in Table 1 below.

TABLE 1

| ND Filter in Stops | ND Factor | Original Exposure Time | New Exposure Time |
|---|---|---|---|
| 1 | 2 | 1 second | 2 seconds |
| 2 | 4 | 1 second | 4 seconds |
| 3 | 8 | 1 second | 8 seconds |

TABLE 1-continued

| ND Filter in Stops | ND Factor | Original Exposure Time | New Exposure Time |
|---|---|---|---|
| 4 | 16 | 1 second | 16 seconds |
| 5 | 32 | 1 second | 32 seconds |
| 6 | 64 | 1 second | 64 seconds |
| 7 | 128 | 1 second | 128 seconds |
| 8 | 256 | 1 second | 256 seconds |
| 9 | 512 | 1 second | 512 seconds |
| 10 | 1024 | 1 second | 1024 seconds (17 minutes) |

While one set of exemplary ND factors and exposure times have been illustrated in table 1 above, one of ordinary skill in the art would recognize that any suitable ND factors and exposure times may be utilized without varying from the scope of this disclosure. As illustrated in Table 1 above, the ND factor and new exposure time may double from one ND filter stop to the next subsequent ND filter stop. Based on the reduction of light resulting from ND filter 212, the shutter speed may correspondingly slow down. For example, if a current shutter speed is $\frac{1}{120}$ as illustrated at point 430 of FIG. 4, processor 202 may determine an ND filter stop in ISO/ND table 216 that corresponds to shutter speed and ambient light brightness level.

In an example, processor 202 may determine that ND filter 212 should be set to an ND-2 stop value. In this example, the ND-2 stop value may reduce the amount of light received by camera 206 to a fourth ($\frac{1}{4}$) of the actual amount of ambient light. Based on the reduction of light, the shutter speed of camera 206 may similarly be reduce by a fourth, such as from $\frac{1}{120}$ to $\frac{1}{30}$. In certain examples, the shutter speed of camera 206 may not be reduced below $\frac{1}{30}$. Instead, camera 206 may increase the ISO value to maintain a proper exposure of the captured images. For example, as the brightness of ambient light reduces, the ISO may increase from ISO 414 to ISO 412. As stated above, ISOs 412 and 414 may be any suitable ISO settings, such as respectively an ISO 200 setting and an ISO 100 setting.

In certain examples, as the ambient light brightness level continues to darken, the ND stop value of ND filter 212 may cause the ISO setting to unnecessarily increase at a greater than needed rate. Based on the increase in the ISO setting, processor 202 may determine that ND filter 212 should be disabled when the ISO setting reaches a particular value, such as an ISO setting of 400. Thus, when the ISO setting is at or above the particular value, processor 202 may disable ND filter 212, if the ND filter is still being applied at that point. After ND filter 212 is disabled, camera 206 may continue to increase the ISO value as the ambient light brightness continues to darken, until the ISO setting reaches a maximum value as illustrated by ISO 410 in FIG. 4. In an example, ISO 410 may be any suitable ISO setting, such as an ISO setting of 3200.

Figure 5:
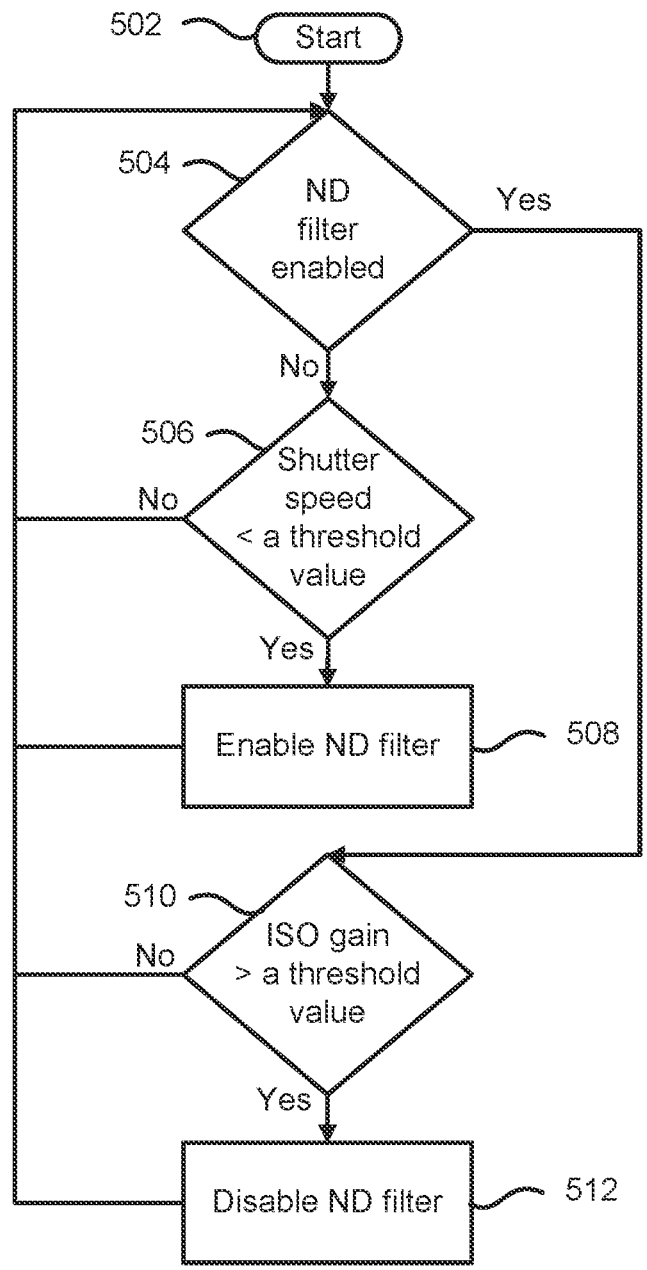
FIG. 5 is a flow diagram of a method for reducing flicker in a digital video camera according to at least one embodiment of the present disclosure.

FIG. 5 is a flow diagram of a method 500 for reducing flicker in a digital video camera according to at least one embodiment of the present disclosure, starting at block 502. In an example, the method 500 may be performed by any suitable component including, but not limited to, processor 202 of FIG. 2, components of camera 206 of FIG. 2, or any other suitable component. Not every method step set forth in this flow diagram is always necessary, and certain steps of the methods may be combined, performed simultaneously, in a different order, or perhaps omitted, without varying from the scope of the disclosure.

At block 504, a determination is made whether a ND filter of an information handling system is enabled. In an example, the ND filter may be a component attached to a camera of the information handling. In certain examples, a piece of glass may be located in between the ND filter and an IR-cut filter of the camera. As stated above, an ND stop value of the ND filter may reduce an amount of light that is received by a lens of the camera.

If the ND filter is not enabled, a determination is made whether a shutter speed of the camera is less than a threshold value at block 506. In an example, the threshold value may be any suitable shutter speed, such as $1/120$ for 60 Hz power frequency. If the shutter speed is not below the threshold value, such as slower than $1/120$, the flow continues as stated above at block 504. If the shutter speed is below the threshold value, such as faster than $1/120$, the ND filter may be enabled, and the flow continues as stated above at block 504. In an example, the ND filter may be set to any suitable ND stop value. For example, the ND stop value may be set to reduce the amount of light received at the camera by a particular fraction, such as an half, a fourth, an eighth, or the like.

If at block 504, the ND filter is enabled, a determination is made whether an ISO gain of the camera is above a threshold value at block 510. In an example, the threshold value for the ISO gain may be any suitable value, such as ISO 200, 400, 800, or the like. If the ISO gain is not above the threshold value, the flow continues as described above at block 504. If the ISO gain is above the threshold value, the ND filter is disabled at block 512 and the flow continues at block 504.

Figure 6:
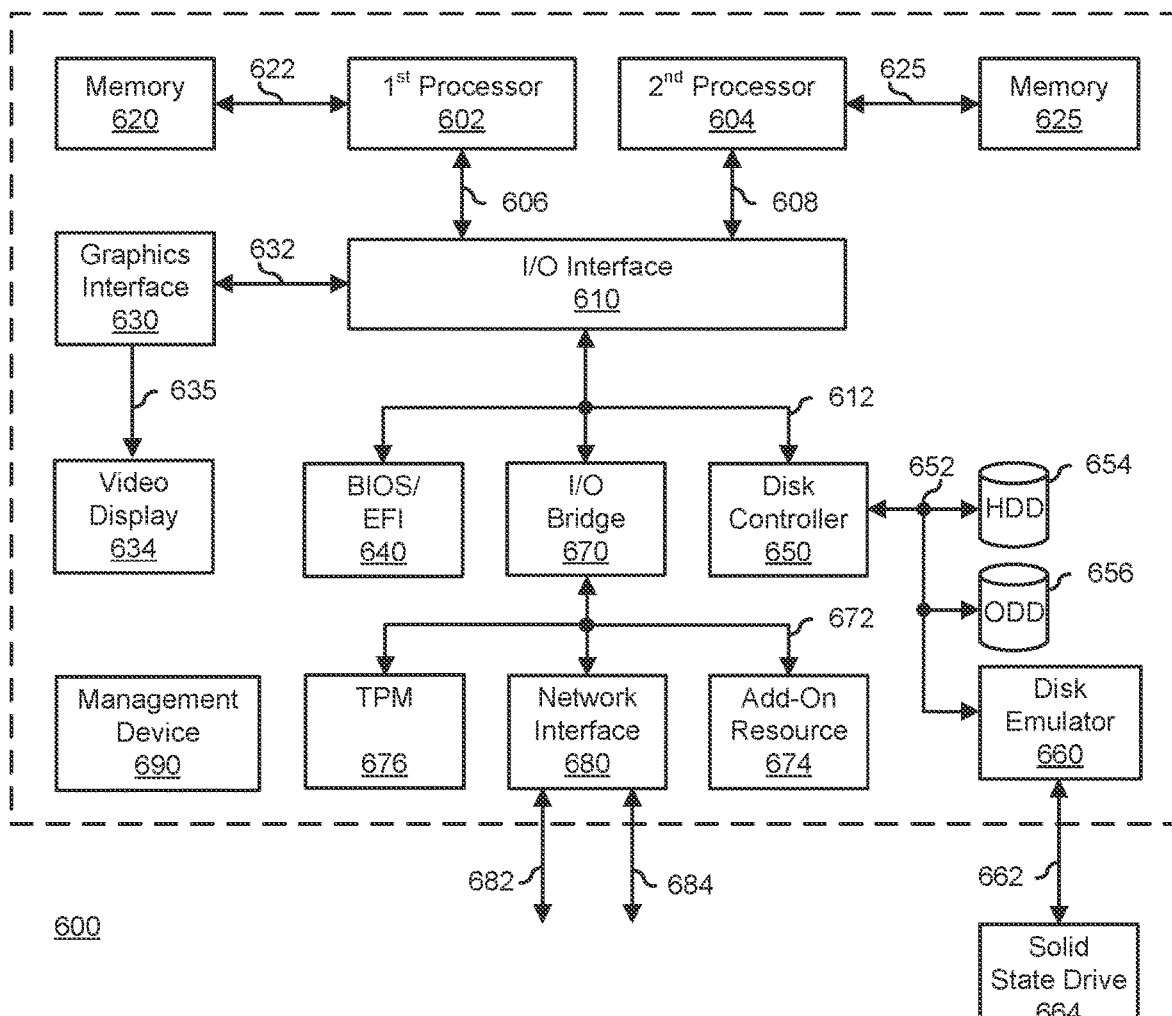
FIG. 6 is a block diagram of a general information handling system according to an embodiment of the present disclosure.

FIG. 6 shows a generalized embodiment of an information handling system 600 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 600 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable medium for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 can include devices or modules that embody one or more of the devices or modules described below and operates to perform one or more of the methods described below. Information handling system 600 includes a processors 602 and 604, an input/output (I/O) interface 610, memories 620 and 625, a graphics interface 630, a basic input and output system/universal extensible firmware interface (BIOS/UEFI) module 640, a disk controller 650, a hard disk drive (HDD) 654, an optical disk drive (ODD) 656, a disk emulator 660 connected to an external solid state drive (SSD) 662, an I/O bridge 670, one or more add-on resources 674, a trusted platform module (TPM) 676, a network interface 680, a management device 690, and a power supply 695. Processors 602 and 604, I/O interface 610, memory 620, graphics interface 630, BIOS/UEFI module 640, disk controller 650, HDD 654, ODD 656, disk emulator 660, SSD 662, I/O bridge 670, add-on resources 674, TPM 676, and network interface 680 operate together to provide a host environment of information handling system 600 that operates to provide the data processing functionality of the information handling system. The host environment operates to execute machine-executable code, including platform BIOS/UEFI code, device firmware, operating system code, applications, programs, and the like, to perform the data processing tasks associated with information handling system 600.

In the host environment, processor 602 is connected to I/O interface 610 via processor interface 606, and processor 604 is connected to the I/O interface via processor interface 608. Memory 620 is connected to processor 602 via a memory interface 622. Memory 625 is connected to processor 604 via a memory interface 627. Graphics interface 630 is connected to I/O interface 610 via a graphics interface 632 and provides a video display output 636 to a video display 634. In a particular embodiment, information handling system 600 includes separate memories that are dedicated to each of processors 602 and 604 via separate memory interfaces. An example of memories 620 and 630 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 640, disk controller 650, and I/O bridge 670 are connected to I/O interface 610 via an I/O channel 612. An example of I/O channel 612 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 610 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 640 includes BIOS/UEFI code operable to detect resources within information handling system 600, to provide drivers for the resources, initialize the resources, and access the resources. BIOS/UEFI module 640 includes code that operates to detect resources within information handling system 600, to provide drivers for the resources, to initialize the resources, and to access the resources.

Disk controller 650 includes a disk interface 652 that connects the disk controller to HDD 654, to ODD 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits SSD 664 to be connected to information handling system 600 via an external interface 662. An example of external interface 662 includes a USB interface, an IEEE 6394 (Firewire) interface, a proprietary interface, or a combination thereof. Alternatively, solid-state drive 664 can be disposed within information handling system 600.

I/O bridge 670 includes a peripheral interface 672 that connects the I/O bridge to add-on resource 674, to TPM 676, and to network interface 680. Peripheral interface 672 can be the same type of interface as I/O channel 612 or can be a different type of interface. As such, I/O bridge 670 extends the capacity of I/O channel 612 when peripheral interface 672 and the I/O channel are of the same type, and the I/O bridge translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as I/O interface 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

Management device 690 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 600. In particular, management device 690 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 600, such as system cooling fans and power supplies. Management device 690 can include a network connection to an external management system, and the management device can communicate with the management system to report status information for information handling system 600, to receive BIOS/UEFI or system firmware updates, or to perform other task for managing and controlling the operation of information handling system 600.

Management device 690 can operate off of a separate power plane from the components of the host environment so that the management device receives power to manage information handling system 600 when the information handling system is otherwise shut down. An example of management device 690 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 690 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system comprising:
 a camera to capture video images for display on a display device of the information handling system;
 a neutral density (ND) filter; and
 a processor to communicate with the camera, the processor to:
  determine a brightness level of an ambient light;
  determine a first shutter speed of the camera;
  set a stop level for the ND filter based on the brightness level of the ambient light and the first shutter speed; and
  in response to the stop level of the ND filter being set, set the camera to a second shutter speed, wherein a first amount of the ambient light let into the camera by the first shutter speed is equal to a second amount of the ambient light let into the camera by a combination of the second shutter speed and the stop level of the ND filter.

2. The information handling system of claim 1, wherein the stop level for the ND filter allows a fraction of the ambient light into the camera.

3. The information handling system of claim 1, wherein the second shutter speed is slower than the first shutter speed.

4. The information handling system of claim 1, wherein the processor further to:
 determine whether an ISO gain of the camera is above a threshold value; and
 based on the ISO gain being above the threshold value, disable the ND filter.

5. The information handling system of claim 1, wherein processor is further to:

determine whether the brightness level is above a predetermined level; and based on the brightness level being above predetermined level, enable the ND filter.

6. The information handling system of claim 1, wherein the second shutter speed is set to a value that is greater than a threshold shutter speed.

7. The information handling system of claim 1, wherein prior to the setting of the stop level for the ND filter, the method further comprises: selecting the stop level from an ISO/ND table in a memory of the information handling system.

8. The information handling system of claim 1, wherein processor is further to: reduce a rate that a shutter speed of the camera is increased as the brightness level increases.

9. A method comprising:
  determining, by a processor of an information handling system, a brightness level of an ambient light;
  determining a first shutter speed of a camera of the information handling system;
  setting a stop level for a neutral density (ND) filter based on the brightness level of the ambient light and the first shutter speed; and
  in response to the stop level of the ND filter being set, setting the camera to a second shutter speed, wherein the second shutter speed is set to a value that is greater than a threshold shutter speed.

10. The method of claim 9, wherein the stop level for the ND filter allows a fraction of the ambient light into the camera.

11. The method of claim 9, wherein a first amount of the ambient light let into the camera by the first shutter speed is equal to a second amount of the ambient light let into the camera by a combination of the second shutter speed and the stop level of the ND filter.

12. The method of claim 9, wherein the second shutter speed is slower than the first shutter speed.

13. The method of claim 9, further comprising:
  determining whether an ISO gain of the camera is above a threshold value; and
  based on the ISO gain being above the threshold value, disabling the ND filter.

14. The method of claim 9, further comprising:
  determining whether the brightness level is above a predetermined level; and
  based on the brightness level being above predetermined level, enabling the ND filter.

15. The method of claim 9, wherein prior to the setting of the stop level for the ND filter, the method further comprises: selecting the stop level from an ISO/ND table in a memory of the information handling system.

16. The method of claim 9, further comprising: reducing a rate that a shutter speed of the camera is increased as the brightness level increases.

17. An information handling system comprising:
  a camera to capture video images for display on a display device of the information handling system;
  an infrared-cut filter in physical communication with the camera, the infrared-cut filter to filter out infrared light from the captured video images;
  a glass in physical communication with the infrared-cut filter;
  a neutral density (ND) filter in physical communication with the glass; and
  a processor to:
    determine a brightness level of an ambient light;
    determine a first shutter speed of the camera;
    set a stop level for the ND filter based on the brightness level of the ambient light and the first shutter speed; and
    set the camera to a second shutter speed, wherein the stop level for the ND filter allows a fraction of the ambient light into the camera, wherein the second shutter speed is slower than the first shutter speed.

18. The information handling system of claim 17, wherein a first amount of the ambient light let into the camera by the first shutter speed is equal to a second amount of the ambient light let into the camera by a combination of the second shutter speed and the stop level of the ND filter.

19. The information handling system of claim 17, wherein the processor further to:
  determine whether an ISO gain of the camera is above a threshold value; and
  based on the ISO gain being above the threshold value, disable the ND filter.

20. The information handling system of claim 17, wherein processor is further to:
  determine whether the brightness level is above a predetermined level; and
  based on the brightness level being above predetermined level, enable the ND filter.

* * * * *